US 7,412,514 B2

United States Patent
Shuster

(10) Patent No.: US 7,412,514 B2
(45) Date of Patent: Aug. 12, 2008

(54) METHOD AND APPARATUS FOR IMPROVING BANDWIDTH EFFICIENCY IN A COMPUTER NETWORK

(75) Inventor: Gary Stephen Shuster, Fresno, CA (US)

(73) Assignee: Hoshiko LLC, Henderson, NV (US)

( * ) Notice: Subject to any disclaimer, the term of this patent is extended or adjusted under 35 U.S.C. 154(b) by 1395 days.

(21) Appl. No.: 09/932,431

(22) Filed: Aug. 17, 2001

(65) Prior Publication Data

US 2002/0091825 A1 Jul. 11, 2002

Related U.S. Application Data

(60) Provisional application No. 60/225,888, filed on Aug. 17, 2000.

(51) Int. Cl.
*G06F 15/173* (2006.01)
(52) U.S. Cl. .................. 709/226; 709/223; 709/224; 709/225
(58) Field of Classification Search .......... 709/224, 709/228; 370/230, 236
See application file for complete search history.

(56) References Cited

U.S. PATENT DOCUMENTS

| 5,526,350 | A |   | 6/1996 | Gittins et al. |         |
|-----------|---|---|--------|----------------|---------|
| 5,638,363 | A |   | 6/1997 | Gittins et al. |         |
| 5,918,020 | A | * | 6/1999 | Blackard et al.| 709/228 |
| 6,085,241 | A |   | 7/2000 | Otis           |         |
| 6,137,777 | A |   | 10/2000| Vaid et al.    |         |
| 6,285,658 | B1| * | 9/2001 | Packer         | 370/230 |
| 6,542,467 | B2| * | 4/2003 | Umayabashi     | 370/236 |
| 6,578,077 | B1| * | 6/2003 | Rakoshitz et al.| 709/224|

OTHER PUBLICATIONS

ET/BWMGR—Bandwidth Manager—The Most Complete Bandwidth Management Product Available For ISPs And Corporate Networks—Online Manuals Complete Rackmount Solutions Bandwidth Management Technology Comparison ET/BWMGR FAQ, http://www.etinc.com/bwmgr.htm; Aug. 13, 2001; pp. 1-5.
ET/BWMGR User Manual; Bandwidth Manager Manual, http://www.etinc.com/bwman.htm; Aug. 13, 2001; pp. 1-42.
ET/BWMGR Examples, http://www.etinc.com/bwsample.htm; Aug. 14, 2001; pp. 1-8.

* cited by examiner

*Primary Examiner*—Larry Donaghue
*Assistant Examiner*—Asghar Bilgrami
(74) *Attorney, Agent, or Firm*—Connoly Bove Lodge & Hutz LLP; Jonathan A. Jaech

(57) ABSTRACT

A method for operating a server to improve bandwidth efficiency in a computer network is disclosed. The server is operable to transmit files between a memory of the server and destinations on the computer network through a communication link having a finite bandwidth. The files are distinguishable by type and the server is provided with a rule set for prioritizing transmission of files by type. The method comprises monitoring a bandwidth usage of the communication link, and triggering application of the rule set when the bandwidth usage exceeds a threshold amount. The threshold amount is determined relative to the finite bandwidth. The method further comprises distinguishing between the files according to type, and prioritizing transmission of the files according to type and according to the rule set.

16 Claims, 2 Drawing Sheets

METHOD AND APPARATUS FOR IMPROVING BANDWIDTH EFFICIENCY IN A COMPUTER NETWORK

CROSS-REFERENCE TO RELATED APPLICATION

This application claims priority pursuant to 35 U.S.C. §119(e) to U.S. Provisional Application No. 60/225,888, filed Aug. 17, 2000, which application is specifically incorporated herein, in its entirety, by reference.

BACKGROUND OF THE INVENTION

1. Field of the Invention

The present invention relates to a method and apparatus for improving bandwidth efficiency in a computer network. More specifically, this invention pertains to a bandwidth management tool that implements a set of rules for directing network traffic according to current network bandwidth levels.

2. Description of Related Art

Bandwidth is a critical resource and a key cost for Internet service providers (ISPs) in particular. Reliable bandwidth usage auditing and monitoring is important in two types of Web hostings offered by ISPs, i.e., "co-location" and "dedicated/shared-services. The Internet is a collection of interconnected (public and/or private) networks linked together by a set of standard protocols (such as TCP/IP and HTTP) to form a global, distributed network. As used herein, "Internet" is intended to refer to what is now commonly known as the Internet, it is also intended to encompass variations which may be made in the future, including changes and additions to existing standard protocols.

Bandwidth refers to maximum available bit rate for a specific application. In the context of a communication link of a computer network, bandwidth refers the maximum information rate that may be transmitted through the link. As used herein, the bandwidth capacity of a communication link includes any limitations such as arise from characteristics of servers, routers, and other network devices along a link.

Overuse of available bandwidth is generally undesirable. Although certain latency is inherently associated with any computer network (latency refers to the delay experienced by a packet from the source to destination), when bandwidth usage of a communication link approaches or saturates the bandwidth (capacity) of a communication link, increased latency and/or transmission failure results. Therefore, it is desirable to operate a computer network so as to preserve a margin of excess bandwidth at all times.

Bandwidth is also a commodity that may be assigned a definite economic value. In co-location services, a customer owns a dedicated Web server located at an Internet Service Provider's (ISP's) facility, and purchases Internet bandwidth from the ISP. The ISP buys bandwidth in bulk and resells it to each customer. Bandwidth is typically purchased in blocks. For example, a company may pay a fixed amount for a block of one hundred megabits of bandwidth. When bandwidth usage exceeds this amount, the company either incurs surcharges (in the event that it has acquired the ability to "burst" over the paid amount) or hits a cap, and is unable to serve all of the content that has been requested of it. The former results in undesired extra charges, with the latter results portions of the content being indiscriminately not served.

In dedicated-server service, customers rent dedicated servers that are owned and maintained by the ISP. In shared-server service, customers rent disk space, and share CPU and ETHERNET bandwidth with other website customers on the ISP's equipment. While this provides a low cost service for the customer, it frequently results in an overcrowding of the equipment and long delays or inaccessibility of the sites sharing the server. When the ISP has a clear picture of usage patterns, users can be relocated onto servers that do not clash with other users, or changed to dedicated-server service.

Accordingly, customers and ISP's alike desire accurate auditing, monitoring, and allocation of the bandwidth usage by each Web hosting customer. Current software tools for these tasks are not optimal.

The Web hosting business is becoming increasingly competitive. Customers are demanding guaranteed serviced and accountability for the access bandwidth charges by their ISPs. The customers too desire to monitor their own usage patterns in real time. It is further desirable to provide a guaranteed quality of service to improve customer satisfaction. In addition, unlike hit-rate data provided by other software, bandwidth usage patterns give web site owners a different way for gauging responses to changes in content on their sites.

A prior art pure-software approach to bandwidth management implements a priority-based queuing algorithm completely in UNIX or WINDOWS. These implementations usually have too much operating system overhead and throughput rarely exceeds 1,000 Kb/s. A prior art pure hardware approach implements a control algorithm in logic. But only very simple algorithms are practical, such as packet counting and dropping when a bandwidth limit is reached. These basic approaches can drop too many packets unnecessarily, which results in massive re-transmission on the Internet. Instead of improving throughput, these algorithms may actually degrade the network. A further disadvantages of hardware methods is that new features, e.g., Internet Protocol versions upgrades, generally require replacement of hardware equipment.

Routers are commonly used in the art and typically implement the use of headers and a forwarding table to determine the path in which data packets are sent. Very little filtering of data is done through routers. In fact, most routers do not distinguish between the different types of data being transmitted. Nevertheless, bandwidth management strategies are typically implemented at the router level. In networks where files of various types and sizes are frequently passed, however, these strategies are often inefficient.

Accordingly, it would be desirable to provide a method and apparatus for monitoring and optimizing bandwidth usage.

SUMMARY OF THE INVENTION

The present invention provides a system and method for operating a server to improve bandwidth efficiency in a computer network, that overcomes the limitations of the prior art. The server is operable to transmit files between a memory of the server and destinations on the computer network through a communication link having a finite bandwidth. The files are distinguishable by type and the server is provided with a rule set for prioritizing transmission of files by type. The method comprises monitoring a bandwidth usage of the communication link, and triggering application of the rule set when the bandwidth usage exceeds a threshold amount. The threshold amount is determined relative to the finite bandwidth. The method further comprises distinguishing between the files according to type, and prioritizing transmission of the files according to type and according to the rule set.

Bandwidth conditions of a given link may vary under different environmental conditions. In practice, synchronous, interactive, and real-time applications, which are bandwidth-sensitive, can require minimum bandwidth guarantees, and can require sustained and burst-scale bit rates. On the other hand, network administrators may want to limit bandwidth taken by non-productive traffic. Even though bandwidth may be allocated for specified applications, it does not mean that these applications are necessarily using that bandwidth. Therefore, the invention provides for enforcing bandwidth restrictions and rules for allocating bandwidth differently, depending on transient network conditions.

A rule set will herein be defined to be a set of techniques or mechanisms including policies that can be applied in a network to manage limited network resources such as bandwidth and the like. These techniques are intended to improve overall network performance and efficiency. They are also intended to provide for more predictability and orderliness in the event of network congestion. The techniques should also isolate faults and provide visibility into performance problems. Additionally, they should meet the diverse user and application requirements as per an organization's business goals. Furthermore, rule sets are intended to increase the "goodput" traffic, i.e., economically desirable traffic, and prevent the abuse of network resources.

The invention further provides various methods for distinguishing between files and thus enables classification of any given file by file type. The rule set is then applied to control the rate of transmission of the file, or whether to allow transmission of a file at all, depending on its file type and on other parameters such as the bandwidth usage and network conditions. The file type may be determined when a file is requested for transfer, or by a disk (memory) crawling agent at periodic intervals. Furthermore, a group of file servers, such as in a server farm, may be instructed to operate according to the same rule set. Modified rule sets or portions thereof may periodically be broadcast to servers in the farm from a master server.

When a predetermined bandwidth threshold is reached on a communication link, a rule set for reducing bandwidth demand may be applied by the server. The rule set preferably provides different rules for application under different conditions. For example, if bandwidth is being used at 80% of capacity, a first rule may be applied. If bandwidth usage increases to 90%, a second rule may be applied, that reduces network demand more than the first rule. In general, the rule set operates to restrict demand by restricting access to bandwidth according to file priority.

A more complete understanding of a method and apparatus for improving bandwidth efficiency in a computer network will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention is directed towards a method and apparatus for improving bandwidth efficiency in a computer network. Combining servers and processing power into a single entity has been relatively common for many years in research and academic institutions. In the detailed description that follows, like element numerals are used to describe like elements illustrated in one or more figures.

A rule set will herein be defined to be a set of techniques or mechanisms including policies that can be applied in a network to manage limited network resources such as bandwidth and the like. These techniques are intended to improve overall network performance and efficiency. They are also intended to provide for more predictability and orderliness in the event of network congestion. The techniques should also isolate faults and provide visibility into performance problems. Additionally, they should meet the diverse user and application requirements as per an organization's business goals. Furthermore, rule sets are intended to improve bandwidth efficiency based on the economic value of network resources.

Figure 1:
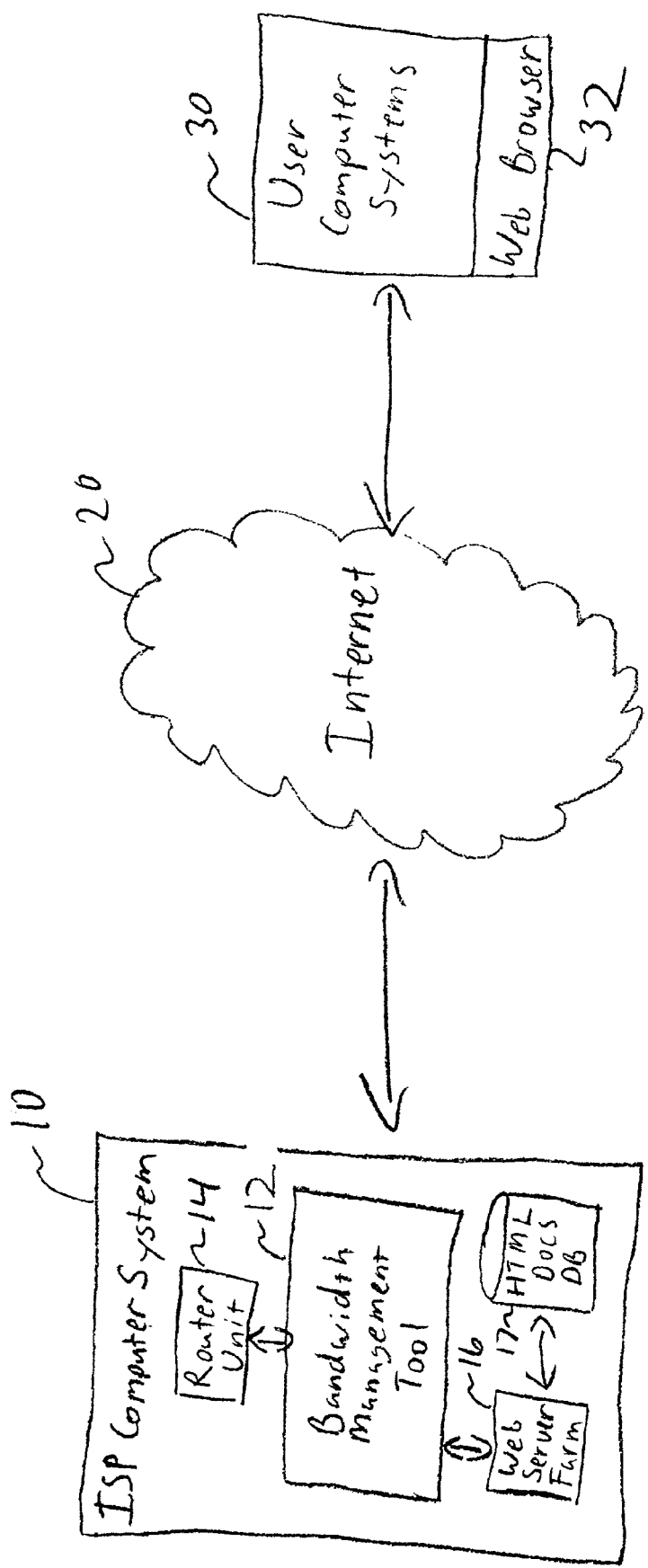
FIG. 1 is a block diagram demonstrating a preferred embodiment of the invention.

Preferred embodiments of the present invention operate in accordance with a plurality of networked computers, such as, for example, a user computer and a server computer which are coupled together on a communications network, such as the Internet or a wide area network. FIG. 1 depicts a block diagram demonstrating a preferred embodiment of the invention. As illustrated, an ISP computer system 10 is shown to communicate with a plurality of user computer systems 30 via the Internet 20. It should be appreciated that user computers 30 may include any type of computing device that allows a user to interactively browse websites, such as a personal computer (PC) that includes a Web browser application 32 (e.g., Microsoft Internet Explorer™ or Netscape Communicator™). Suitable user computers 30 equipped with browsers 32 are available in many configurations, including handheld devices (e.g., PalmPilot™), personal computers (PC), laptop computers, workstations, television set-top devices, multi-functional cellular phones, and so forth.

In a preferred embodiment of the invention, ISP computer system 10 further comprises a bandwidth management tool 12 coupled to a router unit 14 and to a Web server farm 16 connected to an HTML documents database 17. Router unit 14 may comprise a plurality of routers connecting any number of computers in a network. The type of routers used in a preferred embodiment can be of any standard type as known in the art.

Web server farms such as Web server farm 16 are generally known in the art and are typically comprised of a plurality of Web servers. In practice, a Web server farm typically refers to an ISP that provides Web hosting services using multiple servers. More specifically, a server farm is a group of networked Web servers that are housed in one location. In a preferred embodiment, Web server farm 16 streamlines internal processes by distributing the workload between the individual components of the farm and expedites computing processes by harnessing the power of its multiple servers. Web server farms such as Web server farm 16 typically rely on load-balancing software that accomplishes such tasks as tracking demand for processing power from different machines, prioritizing the tasks and scheduling and rescheduling them depending on priority and demand that users put on the network. When one server in the farm fails, another server may be used as a backup.

As is also generally known in the art, Web servers such as those in Web farm 16 access a plurality of Web pages, distributable applications, and other electronic files containing information of various types stored in HTML document databases 17. As a result, Web pages may be viewed on various user computers 30; for example, a particular Web page or other electronic file may be viewed through a suitable application program residing on a user computer 30, such as a browser 32, or by a distributable application provided to the user computer 30 by a Web server. It should be appreciated that many different user computers, many different Web servers, and many different search servers of various types may be communicating with each other at the same time.

It should be further appreciated that a user identifies a Web page that is desired to be viewed at the user computer 30 by communicating an HTTP (Hyper-Text Transport Protocol) request from the browser application 32. The HTTP request includes the Uniform Resource Locator (URL) of the desired Web page, which may correspond to an HTML document stored in the HTML documents databases 17. The HTTP request is routed to the Web servers via the Internet 20. The Web servers then retrieve the HTML document identified by the URL, and communicate the HTML document across the Internet 20 to the browser application 32. The HTML document may be communicated in the form of plural message packets as defined by standard protocols, such as the Transport Control Protocol/Internet Protocol (TCP/IP).

In a preferred embodiment of the invention, a software agent is created and stored within the bandwidth management tool 12 in order to monitor bandwidth usage in a computer network. More specifically, a network manager creates a general set of formulas that can be used to create rules applicable at different bandwidth levels either constantly or at appropriate intervals. For example, the rule for "mp3" files might be: full speed until 90% of bandwidth is achieved; then between 90% and 95%, slow service to a maximum of 1 kbps multiplied by the current bandwidth percentage minus 90, then above 95%, slow service to a maximum of 0.5 kbps multiplied by the current bandwidth percentage minus 90. So, there is a master rule set that is created which can be used by the software agent to generate the specified rule set in light of the then-current bandwidth level.

For further example, the rule set may be as follows:
Maintain below 95% of the 100 megabit cap by invoking as many of the rules (in order) as are necessary:
1. Block service of any files of non-standard types;
2. Block service of any ".zip" files;
3. Cap the speed by which portions of any file exceeding 500 k are served;
4. Block service of any file larger than 1 megabyte;
5. Block service of any files from the "fundownloads" directory.

In addition, the rule set may include formulaic rules, such as "reduce the maximum file size that may be served by 50 k every minute until a bandwidth threshold is no longer exceeded."

So long as the bandwidth usage remains below a specified cap, no limitations are placed on file types or sizes available for download. Once bandwidth usage passes a specified amount (e.g., 95% of the cap, or 95 megabits out of a 100 megabit pipe), the software agent issues commands (either via a network connection, altering the contents of a shared file, or otherwise) that change the behavior of the web server to limit bandwidth based on a specified rule set. The rule set may limit the download speed of specified files (potentially based upon file size), may limit the file types that may be downloaded, the sites that may be downloaded from, may limit the file sizes that may be downloaded, or may otherwise change the behavior of the web servers based upon overall enterprise bandwidth use. In the above description, it should be appreciated that such rules may also apply to file uploads.

In a preferred embodiment, a software agent obtains a list of all file names and their corresponding file sizes in order to determine which files match specific rule-set criteria. The software then manipulates the file names to determine whether they are in fact likely to be parts of a single, larger file. As a first step, the software agent may delete all numbers from selected file names. Any files that are identically named after the elimination of all numbers would then be marked as potentially restrictive and their names and aggregate size would be reported. Of course, this can be limited to numbers in conjunction with specified letters (such as r00, r41, etc., as the "r" denotation often indicates file compression and division via the RAR method). Similarly, this can be limited to specified file types or files other than specified types (for example, graphics files such as *.jpg are often sequentially numbered and may be a good candidate for exclusion).

Figure 2:
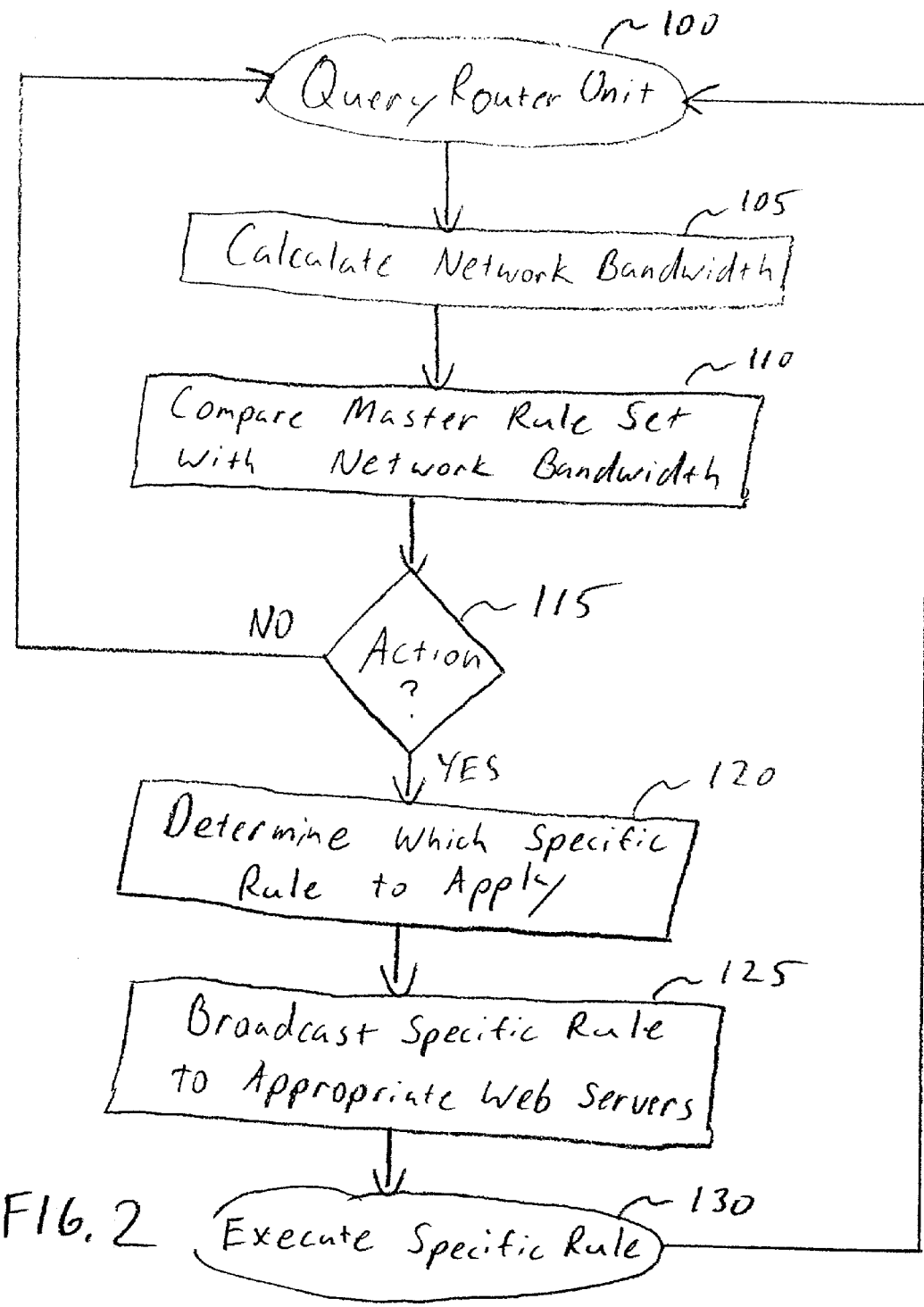
FIG. 2 is a flow chart outlining the operation of a bandwidth management system according to a preferred embodiment of the invention.

FIG. 2 shows a flow chart outlining exemplary operation of a bandwidth management tool 12 according to an embodiment of the invention. This procedure begins at step 100 with a query being made of all routers within router unit 14. Individual results from this query are then compiled by the bandwidth management tool 12 in order to calculate the total network bandwidth at step 105. A comparison is then made at step 110 between the master rule set and the calculated network bandwidth. Depending on how much network bandwidth is being used, the bandwidth management tool 12 then continues at step 115 by determining whether a particular rule-driven action should be made. If an action is indeed required at step 115, then the bandwidth management tool 12 next determines which specific rule corresponds to the current bandwidth conditions of the network at step 120; otherwise, the procedure repeats itself by simply returning to step 100 where the bandwidth management tool 12 again queries router unit 14. Once a specific rule is selected at step 120, the selected rule is then broadcast to all appropriate Web servers within Web server farm 16 at step 125 and then executed accordingly at step 130. The bandwidth management tool 12 then repeats this procedure by returning to step 100 where another router unit 14 query is made.

It should be appreciated that alternative embodiments of the invention may be implemented in which the described master rule set is programmed into each Web server in Web server farm 16 instead of a centralized location (i.e., the bandwidth management tool). In such embodiments, however, it should be further appreciated that router unit 14 queries, such as those described in step 100 of the flow chart in FIG. 2, must be made by each server in Web server farm 16.

Various methods may be used for classifying files for purposes of prioritization. Files may be classifies at the time a file is requested for transmittal to or from the server. In the alternative, software may "crawl" through the file storage memory of a web server to classify files found there. For example a disk crawling agent may seek to identify files that are grouped according to a file naming or directory naming scheme that would permit aggregation of the group files into a single file. Such files are likely to be illicit or undesirable. For example, the software may crawl through the directory structure and obtains a list of all file names and the corresponding file sizes. The software then manipulates the file names to determine whether they are in fact likely to be parts of a single, larger file. Similarly, file crawling may be used to identify specified file types or files other than specified types (for example, graphics files such as *.jpg are often sequentially numbered.

A web crawling agent may also employ a method for identifying data files that are stored on a file server of one web site but not referenced in any hypertext coding on that website. In this embodiment, the software crawls through a directory and identifies hypertext files. Similarly, all non-hypertext files that exceed a user defined size threshold are marked. Then, each of the hypertext files is analyzed by the software in a search for references to the data files previously identified. Any data file that is not referenced by a hypertext file in that directory may marked as low priority or illicit. It should be appreciated that many other methods for classifying files are possible, and will of necessity be adapted as the Internet and its uses evolve over time.

According to an embodiment of the invention, bandwidth regulation—i.e., the applied rule set—is modified based upon geographic origin of the request and/or language of the request. The geographic origin of a request may be determined from a purchased table of IP addresses and location. Also, the language of an HTTP request from any major browser software may be determined from a language preference command in the request header. In the alternative, language may be used as an indicator for location or origin. For example, a message requesting EN-GB, which stands for English, Great Britain dialect, is most likely located in Great Britain. The rule set may be configured to restrict traffic from or to certain geographic areas or in designated languages. For example, by throughput rate to people requesting content in Japanese may be limited to a portion, such as 60%, of comparable rates for requests designating EN-US (English-U.S.). The economic benefit of this approach may be substantial. For example, if a free web hosting operation is able to sell ads for all Japanese traffic for $1 per 1000 displays, but on English-US displays the price is $5 per 1000 displays, an enormous financial benefit may follow from reducing Japanese traffic in favor of EN-US traffic when bandwidth limitations require a reduction in traffic. Vice-versa, if the rate for Japanese-language display ads is higher, the English-US traffic may be reduced.

Having thus described a preferred embodiment of a method and apparatus for improving bandwidth efficiency in a computer network, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A method for operating a server group to improve bandwidth efficiency in a computer network, wherein the server group is operable to transmit files between the server group and destinations on the computer network through a communication link having a finite bandwidth, the method comprising:

monitoring bandwidth usage of a communication link for connecting a server group to a wide area network, using software operably associated with the communication link;

distributing a rule set to individual servers of the server group, wherein the rule set defines rules for limiting serving of data from the individual servers depending on file type and a current state of the bandwidth usage;

characterizing files stored in operable association with the individual servers according to type, using software operating on the individual servers;

informing the individual servers of the current state of the bandwidth usage as monitored by the software operably associated with the communication link; and serving the files from the individual servers to the wide area network via the communication link in compliance with the rule set, so as to limit serving of specified file types from the servers during periods when the bandwidth usage exceeds a threshold amount relative to a finite bandwidth of the communication link.

2. The method of claim 1, wherein the characterizing step further comprises assigning a type to each of the files based on a corresponding file name for each file.

3. The method of claim 2, wherein the characterizing step further comprises characterizing a type of each of the files based on a corresponding file name extension for each file.

4. The method of claim 1, wherein the characterizing step further comprises crawling through a memory operably associated with the individual server to identify associated groups of files, wherein each of the groups of files is configured to be aggregated into a larger file.

5. The method of claim 1, wherein the characterizing step further comprises crawling through files stored in a storage device operably associated with the individual server to identify files that do not contain hyperlinks and are not identified by hyperlinks in other files stored by the storage device.

6. The method of claim 1, wherein the serving step further comprises selecting a rule from the rule set according to the current state of the bandwidth usage.

7. The method of claim 1, further comprising distributing a replacement rule set to individual servers of the server group when the current state of the bandwidth usage changes by more than a specified amount, wherein the replacement rule set replaces the rule set and defines rules for limiting serving of data from the individual servers depending on file type and a current state of the bandwidth usage.

8. The method of claim 1, further comprising repeating the informing step at periodic intervals.

9. A system for operating a plurality of servers to improve bandwidth efficiency in a computer network, the system comprising:

a plurality of servers operable to connect to a computer network through a communication link having a finite bandwidth; and first program instructions operably associated with the communication link to perform the steps of (a) monitoring bandwidth usage of the communication link, (b) distributing a rule set to each of the plurality of servers, wherein the rule set defines rules for limiting serving of data from each of the plurality of servers depending on file type and a current state of the bandwidth usage, and (c) informing each of the plurality of servers of a current state of the bandwidth usage; and second program instructions operably associated with each of the plurality of servers to perform the steps of (d) characterizing files stored in operable association with each of the plurality of servers according to type, and (e) serving the files from each of the plurality of servers to the wide area network via the communication link in compliance with the rule set, so as to limit serving of specified file types from the servers during periods when the bandwidth usage exceeds a threshold amount relative to a finite bandwidth of the communication link.

10. The system of claim 9, wherein the second program instructions are further operable to perform the characterizing step by characterizing a type of each of the files based on a corresponding file name for each file.

11. The system of claim 10, wherein the second program instructions are further operable to perform the characterizing step by characterizing a type of each of the files according to a corresponding file name extension for each file.

12. The system of claim 9, wherein the second program instructions are further operable to perform the characterizing step by crawling through a storage device operably associated with the server to identify associated groups of files, wherein each of the groups of files is configured to be aggregated into a larger file.

13. The system of claim 9, wherein the second program instructions are further operable to perform the characterizing step by crawling through files stored in a storage device operably associated with the server to identify files that do not contain hyperlinks and are not identified by hyperlinks in other files of the storage device.

14. The system of claim 9, wherein the second program instructions are further operable to perform the serving step by selecting a rule from the rule set according to the current state of the bandwidth usage.

15. The system of claim 9, wherein the first program instructions are further operable to distribute a replacement rule set to each of the plurality of servers when the current state of the bandwidth usage changes by more than a specified amount, wherein the replacement rule set replaces the rule set and defines rules for limiting serving of data from each of the plurality of servers depending on file type and a current state of the bandwidth usage.

16. The system of claim 9, wherein the first program instructions further operable to repeat the informing step at periodic intervals.

* * * * *

UNITED STATES PATENT AND TRADEMARK OFFICE
CERTIFICATE OF CORRECTION

PATENT NO. : 7,412,514 B2 Page 1 of 1
APPLICATION NO. : 09/932431
DATED : August 12, 2008
INVENTOR(S) : Gary S. Shuster It is certified that error appears in the above-identified patent and that said Letters Patent is hereby corrected as shown below:

Claim 30, Column 8, line 57, after "name" insert -- extension --.

Signed and Sealed this

Twenty-first Day of October, 2008

JON W. DUDAS
*Director of the United States Patent and Trademark Office*